United States Patent
Panesar

(10) Patent No.: US 10,977,075 B2
(45) Date of Patent: Apr. 13, 2021

(54) PERFORMANCE PROFILING FOR A MULTITHREADED PROCESSOR

(71) Applicant: UltraSoC Technologies Limited, Cambridge (GB)

(72) Inventor: Gajinder Singh Panesar, Cambridge (GB)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/380,439

(22) Filed: Apr. 10, 2019

(65) Prior Publication Data

US 2020/0326975 A1  Oct. 15, 2020

(51) Int. Cl.
*G06F 9/44* (2018.01)
*G06F 9/48* (2006.01)
*G06F 9/54* (2006.01)
*G06F 9/38* (2018.01)

(52) U.S. Cl.
CPC .......... *G06F 9/4843* (2013.01); *G06F 9/3836* (2013.01); *G06F 9/542* (2013.01)

(58) Field of Classification Search
CPC .................. G06F 11/3409; G06F 11/3466
USPC .......................................................... 717/130
See application file for complete search history.

(56) References Cited

U.S. PATENT DOCUMENTS

| | | | |
|---|---|---|---|
| 5,838,810 A | 11/1998 | Buzbee | |
| 6,256,775 B1* | 7/2001 | Flynn | G06F 9/3851 712/E9.053 |
| 6,314,530 B1* | 11/2001 | Mann | G06F 11/348 714/25 |
| 6,356,859 B1* | 3/2002 | Talbot | G06F 11/3414 702/119 |
| 6,507,921 B1* | 1/2003 | Buser | G06F 5/01 714/45 |
| 6,519,766 B1* | 2/2003 | Barritz | G06F 11/3466 714/E11.2 |
| 6,662,358 B1* | 12/2003 | Berry | G06F 9/44 717/128 |

(Continued)

FOREIGN PATENT DOCUMENTS

EP      1 480 126 A2    11/2004

OTHER PUBLICATIONS

Cheng Tan et al.; "LOCUS: Low-Power Customizable Many-Core Architecture for Wearables"; ACM Trans. Embed. Comput. Syst. 17, 1, Article 16 (Nov. 2017), 26 pages.*

(Continued)

*Primary Examiner* — Francisco J Aponte
(74) *Attorney, Agent, or Firm* — Lempia Summerfield Katz LLC

(57) ABSTRACT

An apparatus comprising: a processing unit configured to execute a plurality of threads; a profiling unit configured to: profile the operation of the processing unit over a time period to generate an activity profile indicating when each of the plurality of threads is executed by the processing unit over the time period; analyse the generated activity profile to determine whether a signature of the processing unit's thread execution for the time period matches a signature indicating a baseline of thread execution for the processing unit; output an alert signal if the signature of the processing unit's thread execution for the time period does not match the signature indicating a baseline of thread execution for the processing unit.

15 Claims, 5 Drawing Sheets

(56) References Cited

U.S. PATENT DOCUMENTS

| | | | | |
|---|---|---|---|---|
| 6,954,922 B2* | 10/2005 | Liang | G06F 11/3419 | 710/18 |
| 7,197,652 B2* | 3/2007 | Keller, Jr. | G06F 1/3203 | 713/320 |
| 7,237,242 B2* | 6/2007 | Blythe | G06F 9/505 | 709/224 |
| 7,644,192 B2* | 1/2010 | Dudley | G06F 11/3447 | 710/5 |
| 7,765,094 B2* | 7/2010 | Bodden | G06F 11/3409 | 703/22 |
| 8,117,599 B2* | 2/2012 | Edmark | G06F 11/3612 | 717/127 |
| 8,261,273 B2* | 9/2012 | Narang | G06F 9/5066 | 717/132 |
| 8,275,942 B2* | 9/2012 | Yigzaw | G06F 12/0842 | 711/128 |
| 8,276,124 B2* | 9/2012 | Maennel | G06F 11/3604 | 717/128 |
| 8,286,139 B2* | 10/2012 | Jones | G06F 11/3419 | 717/128 |
| 8,375,369 B2* | 2/2013 | Mensch | G06F 21/121 | 717/130 |
| 8,423,972 B2* | 4/2013 | Levine | G06F 11/3476 | 717/130 |
| 8,522,209 B2* | 8/2013 | Wintergerst | G06F 11/362 | 717/124 |
| 8,667,471 B2* | 3/2014 | Wintergerst | G06F 11/3664 | 717/124 |
| 8,943,479 B1* | 1/2015 | Roskind | G06F 11/3644 | 717/127 |
| 9,077,610 B2* | 7/2015 | Bansal | H04L 43/022 | |
| 9,087,150 B2* | 7/2015 | Biberstein | G06F 11/3466 | |
| 9,128,729 B1* | 9/2015 | Hung | G06F 9/4403 | |
| 9,396,145 B1* | 7/2016 | Chu | G06F 11/3058 | |
| 9,471,458 B2* | 10/2016 | Levine | G06F 11/3423 | |
| 9,588,915 B2* | 3/2017 | Yu | G06F 1/3203 | |
| 10,127,626 B1* | 11/2018 | Ostby | G06T 1/20 | |
| 10,133,602 B2* | 11/2018 | Harris | G06F 9/5027 | |
| 10,268,514 B1* | 4/2019 | Kesarwani | G06F 9/5072 | |
| 10,338,956 B2* | 7/2019 | Al-Jarro | G06F 9/4843 | |
| 2003/0056200 A1* | 3/2003 | Li | G06F 11/323 | 717/128 |
| 2004/0111708 A1* | 6/2004 | Calder | G06F 11/3447 | 717/131 |
| 2004/0216113 A1* | 10/2004 | Armstrong | G06F 9/3851 | 718/104 |
| 2005/0132336 A1* | 6/2005 | Gotwals | G06F 11/3604 | 717/127 |
| 2005/0183065 A1* | 8/2005 | Wolczko | G06F 9/3851 | 717/124 |
| 2005/0229176 A1 | 10/2005 | Findeisen | | |
| 2007/0220518 A1* | 9/2007 | Verbowski | G06F 11/36 | 718/102 |
| 2009/0320021 A1* | 12/2009 | Pan | G06F 11/0715 | 718/100 |
| 2010/0037233 A1* | 2/2010 | Armstrong | G06F 9/3851 | 718/104 |
| 2010/0088491 A1* | 4/2010 | Fusejima | G06F 9/3851 | 712/218 |
| 2010/0115494 A1* | 5/2010 | Gorton, Jr. | G06F 11/3466 | 717/128 |
| 2010/0268995 A1* | 10/2010 | Goodman | G06F 11/349 | 714/45 |
| 2011/0093838 A1* | 4/2011 | Archambault | G06F 8/443 | 717/158 |
| 2011/0119682 A1* | 5/2011 | Hsu | G06F 11/3433 | 718/107 |
| 2011/0283266 A1* | 11/2011 | Gallagher | G06F 9/44 | 717/130 |
| 2011/0295587 A1* | 12/2011 | Eeckhout | G06F 30/33 | 703/21 |
| 2012/0089979 A1* | 4/2012 | Adar | G06F 9/45558 | 718/1 |
| 2012/0180057 A1* | 7/2012 | Levine | G06F 11/3476 | 718/102 |
| 2012/0304020 A1* | 11/2012 | Chiu | G06F 11/3409 | 714/47.1 |
| 2014/0229706 A1* | 8/2014 | Kuesel | G06F 11/30 | 712/31 |
| 2014/0281434 A1* | 9/2014 | Madriles | G06F 9/30076 | 712/227 |
| 2014/0366006 A1* | 12/2014 | Gottschlich | G06F 11/3664 | 717/125 |
| 2014/0380282 A1* | 12/2014 | Ravindranath Sivalingam | G06F 11/3419 | 717/128 |
| 2015/0067847 A1 | 3/2015 | Cher et al. | | |
| 2016/0171390 A1* | 6/2016 | Mohammad Mirzaei | G06F 11/3438 | 706/12 |
| 2016/0179569 A1* | 6/2016 | Gottschlich | G06F 12/084 | 711/147 |
| 2016/0196198 A1* | 7/2016 | Ajith Kumar | G06F 11/3495 | 714/45 |
| 2016/0210170 A1* | 7/2016 | Scheuer | G06F 11/3476 | |
| 2016/0232029 A1* | 8/2016 | Duale | G06F 11/26 | |
| 2017/0083420 A1* | 3/2017 | Duale | G06F 9/46 | |
| 2017/0109251 A1* | 4/2017 | Das | G06F 11/3017 | |
| 2017/0153962 A1 | 6/2017 | Biegun et al. | | |
| 2017/0220446 A1* | 8/2017 | Scheuer | G06F 11/3423 | |
| 2017/0286111 A1* | 10/2017 | Pereira | G06F 12/0875 | |
| 2018/0053071 A1* | 2/2018 | Chen | G06N 5/003 | |
| 2018/0113965 A1* | 4/2018 | Harris | G06F 30/20 | |
| 2018/0157535 A1* | 6/2018 | Dushok | G06F 9/485 | |
| 2018/0300130 A1* | 10/2018 | Appu | G06F 12/084 | |
| 2019/0073224 A1* | 3/2019 | Tian | G06F 11/3065 | |
| 2019/0179728 A1* | 6/2019 | O'Dowd | G06F 11/302 | |
| 2019/0265974 A1* | 8/2019 | Cheng | G06T 1/20 | |
| 2019/0317741 A1* | 10/2019 | Herr | G06F 8/41 | |
| 2019/0317880 A1* | 10/2019 | Herr | G06F 11/3612 | |
| 2019/0332520 A1* | 10/2019 | Myers | G06F 11/3644 | |
| 2019/0340022 A1* | 11/2019 | Brewer | G06F 11/3466 | |

OTHER PUBLICATIONS

Panesar, "Hardware Monitors Provide the Tools for Optimization at Scale," PowerPoint presented at proceedings of the Linley Spring Processor Conference, Santa Clara, CA, Apr. 11, 2018, 29 pages.

Search Report Under Section 17, for related application GB Application No. 1905094.7, dated Sep. 20, 2019, 3 pages.

European Patent Office, Extended European Search Report for EP Application No. 20168941.1 dated Aug. 9, 2020, 7 pages.

* cited by examiner

PERFORMANCE PROFILING FOR A MULTITHREADED PROCESSOR

FIELD

This invention relates to monitoring performance of a processing unit as it performs multithreading.

BACKGROUND

Computing devices typically include one or more processing units that execute program instructions to perform tasks specified by those instructions. Processing units could be, for example, central processing units (CPUs) or graphics processing units (GPUs).

A processing unit may support multithreading, which is the ability of the processing unit to execute multiple threads of instructions. To do this, the processing unit may schedule threads of instructions for execution so that a single thread is being executed by the processing unit at any given time. A thread can be 'swapped out'—meaning execution of that thread stops—and another thread 'swapped in'—meaning execution of that thread begins. Over a given period of time, a thread may be swapped in and out one or more times. In other words, the processing unit may perform multithreading by interleaving execution of different threads over time.

It may be desirable to obtain information on the performance of the processing unit as it executes the threads of instructions. This might be for the purpose monitoring the performance level of the processing unit and/or as part of threat and security management.

SUMMARY

According to the present invention, there is provided an apparatus comprising: a processing unit configured to execute a plurality of threads; and a profiling unit configured to: profile the operation of the processing unit over a time period to generate an activity profile indicating when each of the plurality of threads is executed by the processing unit over the time period; analyse the generated activity profile to determine whether a signature of the processing unit's thread execution for the time period matches a signature indicating a baseline of thread execution for the processing unit; and output an alert signal if the signature of the processing unit's thread execution for the time period does not match the signature indicating a baseline of thread execution for the processing unit.

The activity profile may indicate the number of processing unit clock cycles spent executing each thread over the time period.

The profiling unit may be configured to profile the operation of the processing unit by identifying each thread being executed by the processing unit over the time period to generate the activity profile.

The apparatus may be an integrated circuit chip comprising interconnect circuitry, and the profiling unit may be configured to identify each thread being executed by the processing unit over the time period by monitoring transactions over interconnect circuitry of the integrated circuit chip.

The processing unit may be configured to maintain a storage location indicating the thread being executed, and the profiling unit be configured to identify each thread being executed by accessing the storage location.

The profiling unit may be configured to identify each thread being executed from sideband signals communicated from the processing unit.

The profiling unit may be configured to store the generated activity profile as a data array.

The profiling unit may be configured to analyse the generated activity profile using a data processing algorithm on the data array to determine whether the activity profile can be classified as indicating a baseline of thread execution for the processing unit or not.

The data processing algorithm may be a trained data classification model.

The profiling unit may be configured to use the data processing algorithm to calculate the difference between the data array and each of a set of one or more template data arrays each indicating a baseline of thread execution for the processing unit, the data array being classified as indicating a baseline of thread execution if the difference between that data array and at least one of the template arrays is less than a specified threshold.

The profiling unit may be configured to use the data processing algorithm to extract from the data array values for a set of one or more parameters characterising the signature of the processing unit's thread execution for the time period; and compare the extracted values with corresponding parameter values for a signature indicating a baseline of thread execution.

The set of one or more parameters may comprise one or more of: total number of thread switches over the time period; average length of thread execution for the time period; maximum length of thread execution for the time period; minimum length of thread execution for the time period; average frequency of thread switches for the time period; maximum and/or minimum frequency of thread switches for the time period; and sequences of thread execution for the time period.

The profiling unit may be configured to output the alert signal if the data array is classified as not representing a baseline of thread execution for the processing unit.

The data array may be an image that depicts when each thread is being executed by the processing unit over the time period and the data processing algorithm may be an image processing algorithm.

The profiling unit may be configured to analyse the generated activity profile using the image processing algorithm on the generated image to determine whether the generated image can be classified as depicting a baseline of thread execution for the processing unit or not.

The image processing algorithm may be a trained image classification model.

The profiling unit may be configured to use the image processing algorithm to calculate the difference between the generated image and each of a set of one or more template images each depicting a baseline of thread execution for the processing unit, the generated image being classified as depicting a baseline of thread execution if the difference between that image and at least one of the template images is less than a specified threshold.

According to a second aspect, there is provided a method of monitoring the performance of a processing unit executing a plurality of threads, the method comprising: profiling the operation of the processing unit over a time period to generate an activity profile indicating when each of the plurality of threads was executed by the processing unit over the time period; analysing the generated activity profile to determine whether a signature of the processing unit's thread execution for the time period matches a signature indicating a baseline of thread execution for the processing unit; and outputting an alert signal if the signature of the processing unit's thread execution for the time period does not match the signature indicating a baseline of thread execution for the processing unit.

The step of profiling may comprise identifying each thread being executed by the processing unit over the time period to generate the activity profile.

The processing unit may form part of an integrated circuit chip, and the method may comprise identifying the thread being executed by monitoring transactions over interconnect circuitry of the integrated circuit chip.

The method may comprise identifying each thread being executed by the processing unit by accessing a storage location maintained by the processing unit indicating the thread being executed by the processing unit.

The method may comprise identifying each thread being executed by the processing unit from sideband signals communicated from the processing unit.

The method may further comprise storing the generated activity profile as a data array.

The step of analysing the generated activity profile may comprise using a data processing algorithm on the data array to determine whether the activity profile can be classified as indicating a baseline of thread execution for the processing unit or not.

The data processing algorithm may be a trained data classification model.

The method may comprise using the data processing algorithm to calculate the difference between the data array and each of a set of one or more template data arrays each indicating a baseline of thread execution for the processing unit, the data array being classified as indicating a baseline of thread execution if the difference between that data array and at least one of the template arrays is less than a specified threshold.

The method may comprise using the data processing algorithm to extract from the data array values for a set of one or more parameters characterising the signature of the processing unit's thread execution for the time period; and comparing the extracted values with corresponding parameter values for a signature indicating a baseline of thread execution.

The method may comprise outputting the alert signal if the data array is classified as not representing a baseline of thread execution for the processing unit.

The data array may be an image that depicts when each thread is being executed by the processing unit over the time period and the data processing algorithm is an image processing algorithm.

The step of analysing the generated activity profile may comprise using the image processing algorithm on the generated image to determine whether the generated image can be classified as depicting a baseline of thread execution for the processing unit or not.

The image processing algorithm may be a trained image classification model.

The image processing algorithm may calculate the difference between the generated image and each of a set of one or more template images each depicting a baseline of thread execution for the processing unit, the generated image being classified as depicting a baseline of thread execution if the difference between that image and at least one of the template images is less than a specified threshold.

According to a third aspect, there is provided a non-transitory computer-readable storage medium having stored thereon computer instructions that, when executed by a computing unit of an apparatus comprising a processing unit configured to execute a plurality of threads, causes the computing unit to perform a method of monitoring the performance of the processing unit, the method comprising: profiling the operation of the processing unit over a time period to generate an activity profile indicating when each of the plurality of threads was executed by the processing unit over the time period; analysing the generated activity profile to determine whether a signature of the processing unit's thread execution for the time period matches a signature indicating a baseline of thread execution for the processing unit; and outputting an alert signal if the signature of the processing unit's thread execution for the time period does not match the signature indicating a baseline of thread execution for the processing unit.

BRIEF DESCRIPTION OF DRAWINGS

The present invention will now be described by way of example with reference to the accompanying drawings. In the drawings.

DETAILED DESCRIPTION

The following disclosure describes a profiling architecture for profiling the performance of a processing unit executing multiple instruction threads. The profiling architecture and the processing unit may form part of, i.e. be implemented on, an integrated circuit chip (ICC). The integrated circuit chip may be an SoC or a multi-chip module (MCM). The profiling architecture includes a profiling unit that monitors the performance of the processing unit as it interleaves execution of the threads over a specified time period to obtain an activity profile for the processing unit. The activity profile indicates when each of the threads was being executed by the processing unit over that time period, i.e. it contains information delineating the interleaved execution of the threads. The profiling unit can profile the processing unit to generate the activity profile in a non-intrusive manner, that is, without interrupting the execution of instructions performed by the processing unit. This may be done by, for example, implementing the profiling unit as a hardware block that monitors transactions over the interconnect circuitry as the processing unit executes the threads. Once the activity profile has been generated, the profiling unit analyses the profile to determine whether a signature for the thread execution over the time period matches a signature indicating a specified mode of operation. The specified mode of operation might be a 'normal' or 'safe' mode of operation for the processing unit. The signature may refer to the pattern of execution of the threads, or more generally to information characterising the pattern of thread execution. If the profiling unit determines that the signature for the thread execution over the monitored time period does not match the signature indicating the specified mode of operation, the profiling unit generates an output signal. The output signal indicates that the processing unit is not operating in accordance with a specified mode of operation. For example, the output signal might indicate the processing unit is not operating in a normal or safe mode of operation, that is, it is operating in an anomalous manner. The signal may be output to another component of the ICC, or to a component located off-chip.

Figure 1:
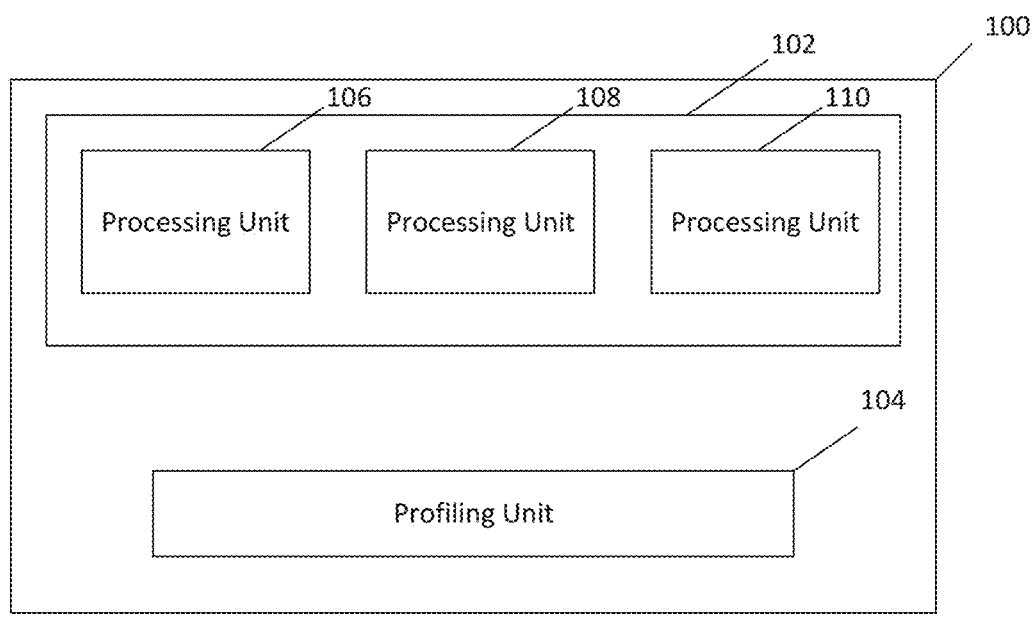
FIG. 1 is a schematic diagram of the architecture of an example integrated circuit chip.
Figure 2:
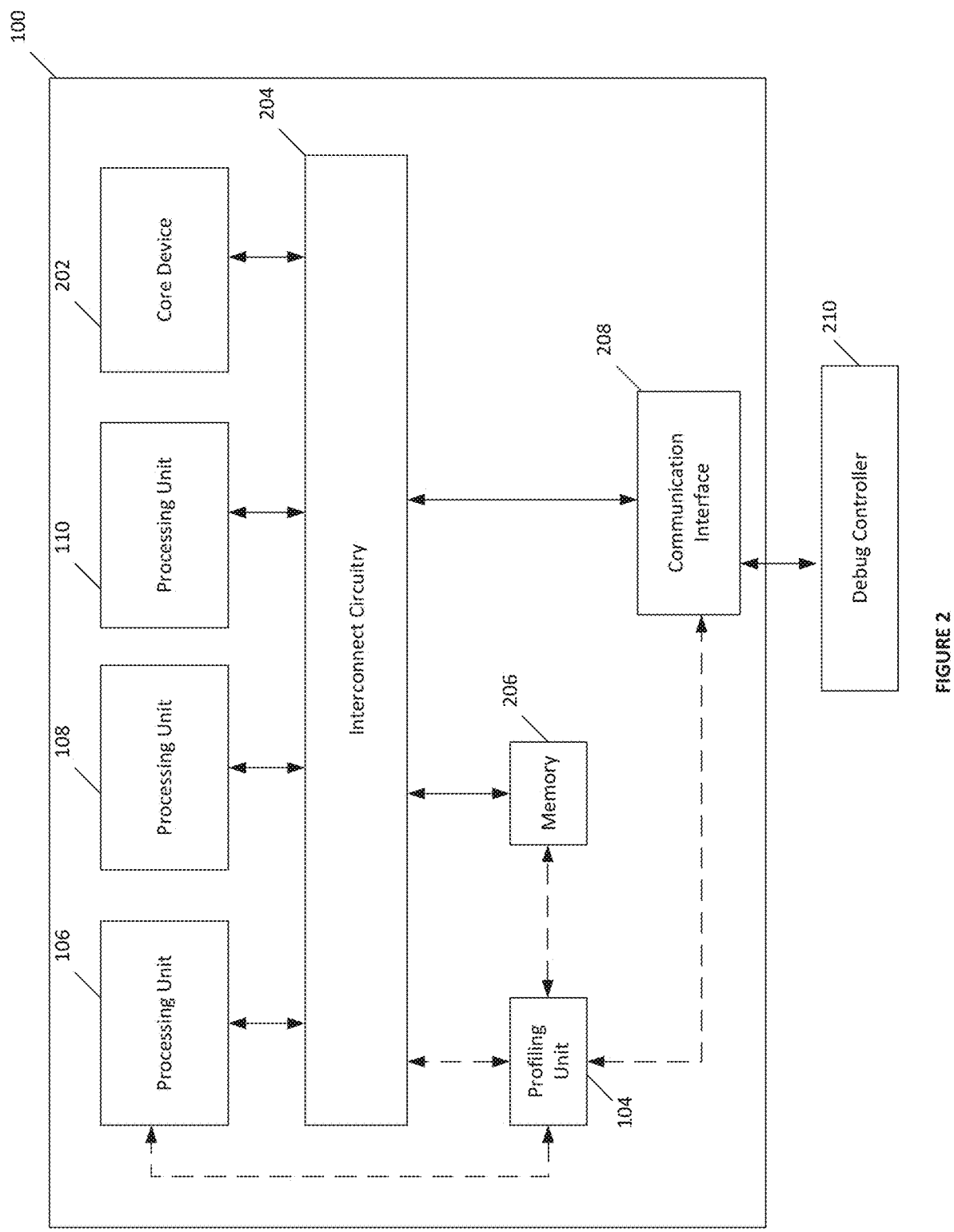
FIG. 2 is a schematic diagram of the architecture of an example integrated circuit chip.
Figure 3:
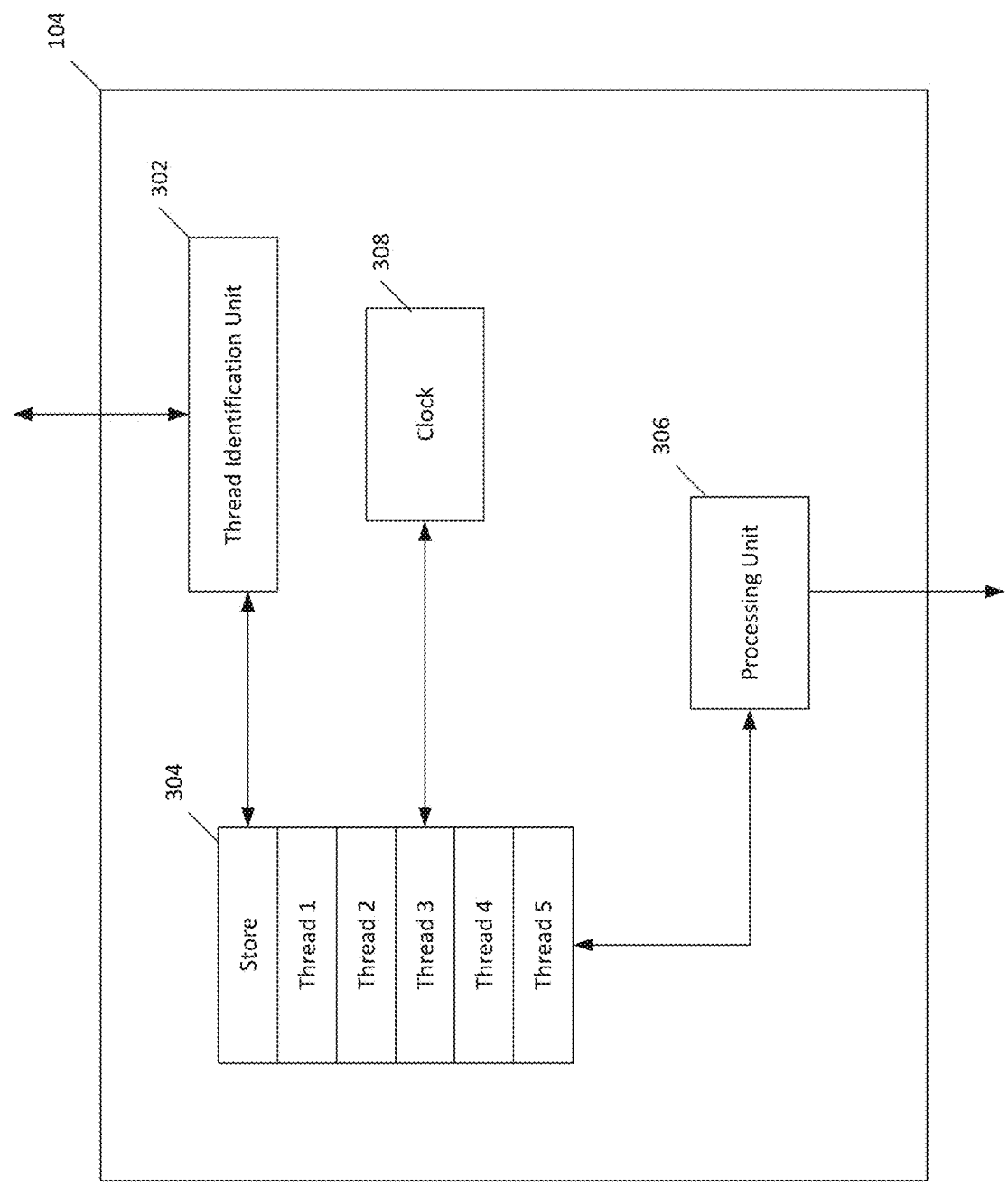
FIG. 3 is a schematic diagram of a profiling unit for profiling the performance of a processing unit executing a plurality of threads.

FIGS. 1 to 3 are schematic diagrams of ICC architectures, and components within ICC architectures. These figures present the structures in terms of functional blocks. Some functional blocks for carrying out functions well known in the art have been omitted. The functional blocks may not delineate different physical structures and may not define a strict division between different logical elements of the ICC device. Each functional block may be implemented in hardware, software, or a combination thereof.

Figure 5:
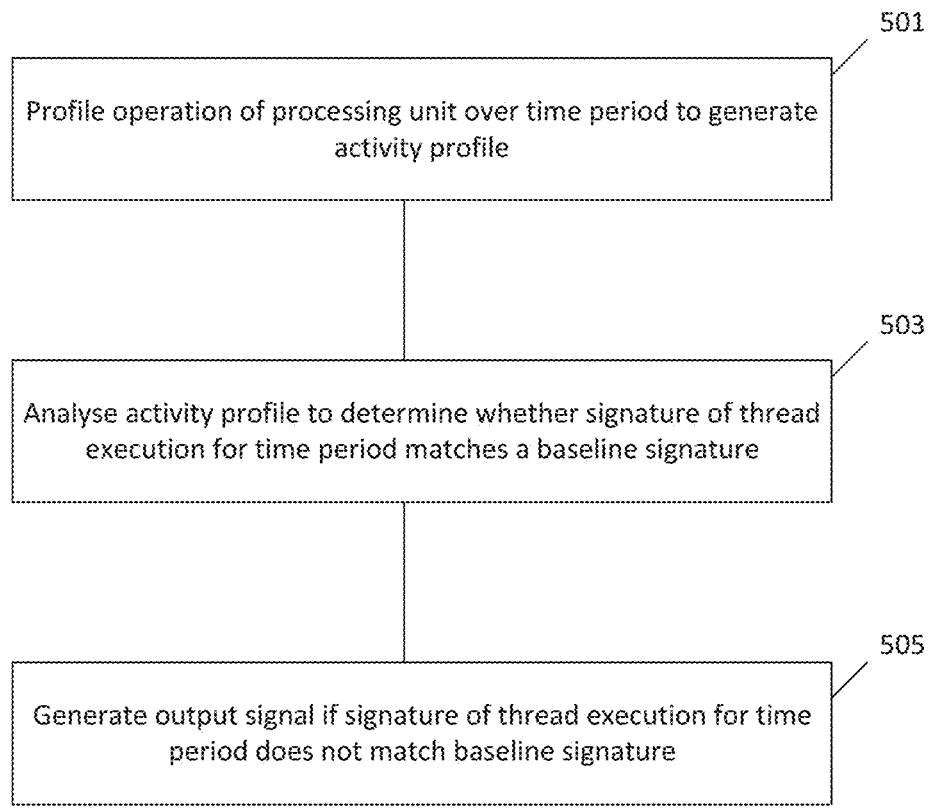
FIG. 5 shows a flowchart of steps for a method of profiling the performance of a processing unit executing a plurality of threads.

FIG. 5 shows a flowchart of steps of a method for monitoring the performance of a processing unit. However, the flowchart is not intended to necessarily restrict the order in which the steps of the method can be performed. The steps of the method may be carried out in alternative orders to that depicted in FIG. 5. The steps of the method may also be implemented concurrently with each other so that the implementation of different steps may at least partially overlap in time.

FIG. 1 illustrates the general structure of an exemplary profiling architecture for an ICC 100. The ICC may be a system-on-chip (SoC) device. The ICC 100 comprises system circuitry 102 and a profiling unit 104.

The system circuitry 102 comprises a plurality of processing units. In this example, there are three processing units: 106, 108 and 110. Each processing unit could be, for example, a CPU (e.g. a single-core CPU, dual-core CPU, quad-core CPU etc.) or a GPU. The processing units may each be arranged to support multithreading by temporally interleaving execution of a plurality of threads. In the examples described herein, each processing unit executes five threads, though it will be appreciated this number has been chosen merely for the purposes of illustration. The system circuitry 102 may comprise further components, not shown in FIG. 1 for clarity.

The profiling unit 104 is arranged to profile the performance of one or more of the processing units 106-110 and to generate an output signal if it determines a signature of the thread execution by a processing unit indicates that processing unit is not operating in a normal or safe manner; i.e. it is operating in an anomalous manner.

FIG. 2 shows a more detailed view of the exemplary architecture of the ICC 100. The system circuitry is shown comprising processing units 106, 108 and 110; a core device 202; interconnect circuitry 202; a memory 206; and a communication interface 208. It will be appreciated that any number of core devices may suitably be implemented within the ICC, depending on implementation. Exemplary core devices include a DSP (digital signal processor), video processor, system memory, bus, software, data, custom circuit and a data engine. This list of examples is non-limiting, and any component of an ICC is suitable for being incorporated into the architecture shown in FIG. 2 as a core device. The core devices may be emulators or simulators of other devices on the chip. For example, a core device may emulate a processor. It is noted that processing units 106-110; memory 206 and interconnect circuitry 204 are also examples of core devices but are shown in FIG. 2 as separate components for the purpose of clarity.

The processing units 106-110 and core device 202 are shown connected to the interconnect circuitry 204. The interconnect circuitry 204 may be a bus, or bus network. Alternatively, the interconnect circuitry may be a network of nodes (e.g. a mesh network of nodes); a ring network or a shared hub. Alternatively, the interconnect circuitry may comprise any combination of one or more shared hubs, buses, ring networks and mesh networks.

The interconnect circuitry 204 transports data between components of the ICC 100. The data may be communicated over the interconnect circuitry 204 in the form of discrete messages. The messages may form part of transactions between components of the ICC governed by a transaction protocol. That is, a transaction may involve one or more messages being communicated between components of the ICC. In other words, the interconnect circuitry may transport data between the components of the ICC as transactions in accordance with a transaction protocol. The interconnect circuitry may for example support transactions between different core devices. Each transaction message communicated over the interconnect circuitry may comprise multiple fields. Each message could for example include an address field. The address field may contain an indication of the source and/or destination address. The address field may for example store a source ID; i.e. the ID of the device/component that initiated communication of the message. The device or component that initiated communication of the message may be referred to as the initiator. Thus, the address field may contain an ID for the initiator. The address field may additionally store a destination ID; i.e. the ID of the intended recipient device/component of the message. The device/component that initiated the transaction may be referred to herein as a master device/component. Alternatively, or in addition, the address field may contain an indication of the address of the device or component within the ICC 100 that is a party to the transaction but did not initiate the transaction (which may be referred to herein as a slave device/component). For example, the address field may contain an ID of a or each (slave) device/component that is a party to the transaction. Thus, a master device may initiate (and terminate) a transaction. In the case that a message originates from one of processing devices 106-110, the message may contain an indication of the thread executed by the processing unit that caused that message to be communicated. The indication may be in the form of a thread ID.

A slave device may listen to the interconnect circuitry for messages. A slave device may be the device addressed by the master device. Each device of the ICC 100 may also be a transmitter device, a receiver device, or both. A transmitter device is a device that transmits messages to the interconnect circuitry 204. A receiver device is a device that receives data from the interconnect circuitry 204. Transmitter/receiver devices are not necessarily master/slave devices respectively. For example, it is possible for a master device to operate as a receiving device; equally, it is possible for a slave device to operate as a transmitter device. In some examples, the communication protocol that governs transactions over the interconnect circuitry 204 may specify that only one master device can be active at a time.

Memory 206 is shown connected to the interconnect circuitry 204. The memory 206 may be a non-volatile memory. Memory 206 may be the system memory of the ICC 100. Although the system memory has been described above as an example of a core device, memory 206 (like interconnect circuitry 204) is shown as a separate component for the purposes of clarity. Memory 206 may be formed of one or more physical memory devices, which may be either physically connected or separate. Memory 206 may be formed of multiple sub-regions or portions referred to as memory blocks. That is, a block of memory may be referred to herein as a portion of memory.

Memory 206 may be formed of multiple blocks. The blocks may be of equal size or different sizes to each other.

The profiling unit 104 may be connected to the interconnect circuitry 204 or directly to the processing units (a connection to only one processing unit (106) is shown in FIG. 2 for clarity). Thus, the profiling unit 104 is a hardware block, i.e. it is hardware circuitry. If connected to the interconnected circuitry 204, the profiling unit 104 may be said to be connected to the processing units through the interconnect circuitry 204. The possible connection of the profiling unit 104 to the system circuitry will be explained in more detail below.

The profiling unit 104 is also shown connected to communication interface 208. Communication interface 208 may be configured to communicate with entities off chip (i.e. entities external to the chip 100). For example, the profiling unit 104 may communicate with an off-chip debug controller 210 via the communication interface 208, for example by communicating information on the profiled performance of the processing units 106, 108 and 110. Communication interface 208 may also be configured to communicate with other entities on-chip. For example, profiling unit 104 may communicate with an on-chip debug controller (not shown in FIG. 2) via communication interface 208. Although FIG. 2 illustrates one communication interface, any number of communication interfaces can be integrated onto the ICC 100. The communication interfaces implemented are chosen in dependence on the type of connections that are to be made. Exemplary communication interfaces include: traditional debug interfaces such as JTAG, parallel trace input/output, and Aurora based high-speed serial interface; and reuse of system interfaces such as USB, Ethernet, RS232, PCIe and CAN.

A method will now be described in which the operation of a processing unit is profiled using the profiling unit 104 to detect whether the processing unit is operating in accordance with a specified mode of operation, e.g. a safe or normal mode of operation, or whether it is operating in an anomalous manner. This method will be described with reference to the flow chart in FIG. 5. In this example, the processing unit being profiled is processing unit 106. This processing unit has been chosen for the purposes of illustration only, and it will be appreciated that one or more of processing units 108 and 110 can be profiled in an analogous manner.

At step 501, the profiling unit 104 profiles the operation of processing unit 106 over a time period to generate an activity profile. This time period may be referred to herein as the 'profiling period'.

The time period may be a specified time period. The value of the time period may be implementation specific. The value of the time period might be set by the profiling unit 104. It might be programmable.

The activity profile indicates when each of the plurality of instruction threads are being executed by the processing unit 106 within the profiling period. In other words, the activity profile delineates, for example specifies, the interleaved execution of the threads by the processing unit 106. The activity profile might indicate, for each thread, the time intervals that thread was executed by the processing unit 106. That is, the activity profile might indicate the execution start times and execution end times for each thread over the profiling period. The granularity of the activity profile may vary by implementation, but at its finest granularity, might indicate the number of clock cycles of the processing unit 106 spent executing each thread within the time period. That is, the activity profile might indicate the time intervals each thread was executed by the processing unit 106 in terms of clock cycle numbers.

FIG. 3 shows an example internal architecture of the profiling unit 104. It comprises a thread identification unit 302; a store 304 and a processing unit 306. The store 304 may be or form part of an internal memory of the profiling unit 104. The store 304 stores data defining the activity profile. The store 304 stores, for each thread, information indicating when that thread is executed by the processing unit 106 within the profiling period. That information may be in the form of time intervals of execution or execution start and end times as described above. In the example shown, the store 304 comprises a set of entries each corresponding to a respective thread executed by the processing unit 106. The profiling unit 104 can store within each entry timing information for the execution of the associated thread.

To profile the performance of the processing unit 106, the profiling unit 104 tracks the thread being executed by the processing unit 106 over the time period. In other words, the profiling unit 104 identifies each thread currently being executed by the processing unit 106 over the time period. This enables the time intervals each thread is being executed to be determined and written to the store 304.

The identification of the thread currently being executed by processing unit 106 is performed by the thread identification unit 302. One way to identify the thread being executed by the processing unit 106 is to monitor transactions communicated over the interconnect circuitry 204. This is possible if the profiling unit 104 is connected to the interconnect circuitry 204. As mentioned above, messages forming part of a transaction caused by the execution of an instruction by the processing unit might contain an indication of the thread of which that instruction forms part. Thus, by monitoring transactions communicated over the interconnect circuitry, the thread identification unit 302 (and hence more generally the profiling unit 104) can determine when and which thread is being executed by the processing unit. Alternatively, an identification (e.g. ID) of the thread being executed by the processing unit 106 might be communicated in a sideband signal communicated over the interconnect circuitry 204, which can be monitored by the profiling unit 104. An example of interconnect circuitry that supports sideband signalling is the AXI bus. A sideband signal may refer to a signal that is not part of the bus standard for the bus forming part of the interconnect circuitry, but that is communicated between two components over the bus and is understandable (that is, carries data that has meaning) to the components it's communicated to. 'Monitoring' the interconnect circuitry may mean that the profiling unit 104 observes communications over the interconnect circuitry (e.g. transactions and/or sideband signals) without extracting those communications from the interconnect circuitry. For example, a copy of those communications might be generated by the profiling unit and analysed to identify the thread. The copies of those communications might then be discarded by the profiling unit following the analysis. This is convenient because it enables the interconnect circuitry to be observed without impeding the transmission of those communications across the ICC 100.

Alternatively, the thread identification unit 302 might identify the thread being executed by the processing unit 106 from observing or monitoring an indication of the thread ID stored in a region of memory maintained by the processing unit 106. In other words, the processing unit 106 might maintain a region of memory that stores an indication of the thread currently being executed by that processing unit. That region of memory might be a hardware cache or register. It could for example be a status register, e.g. a CPU status register if processing unit 106 is a CPU. It might be internal to the processing unit or external but accessible to the processing unit. The region of memory forms part of the ICC 100. In the example shown in FIG. 2, this region of memory forms part of memory 206. The thread identification unit 302 might observe the thread ID stored in the maintained region of memory from signals communicated from the processing unit 106, which the thread identification unit 302 observes. The observed signals could for example be signals the processing unit 106 communicates to update or set the thread ID stored in the region of memory. Alternatively, the thread identification unit 302 may access the maintained region of memory to determine the thread being executed by the processing unit 106. The thread identification unit 302 might access the memory region periodically.

Having identified the thread being executed by the processing unit 106, the thread identification unit 302 communicates an indication of that thread to the store 304. The store 304 can then identify the time execution of that thread began, for example using a clock signal from clock 308. Though clock 308 is shown forming part of the profiling unit 104 in this example, it will be appreciated that in other examples the store may receive a clock signal from a clock external to the profiling unit 104. In response to receiving an indication from the thread identification unit 302 that the thread being executed has changed, the store 304 uses the received clock signal to log the time execution of the previous thread stopped and execution of the next thread began. Thus, in summary, in response to receiving an indication from thread identification unit 302 that a particular thread is being executed by processing unit 106, the store 304 uses the received clock signal to perform the following actions: 1) log the time execution of the preceding thread ended in the associated entry; and 2) log the time the execution of the particular thread started in the associated entry.

The above approaches to profiling the execution of threads by the processing unit 106 can conveniently be performed in a non-intrusive manner. That is, the profiling unit 104 can profile the thread executions without interrupting those executions. This is because the profiling unit 104 is a hardware component that enables profiling to be performed through monitoring, for example either transactions or signals communicated over interconnect circuitry, or memory maintained by the processing unit. In contrast, typical approaches to profiling interrupt execution of instructions at the processing unit to enable profiling software to be run, which is intrusive.

Having generated the activity profile characterising the temporally interleaved execution of the threads by processing unit 106 over the profiling period, the profiling unit 104 stores the activity profile. The activity profile may be stored in memory, for example a memory local to the profiling unit 104 (not shown in FIG. 3) or some other memory in the ICC 100, for example memory 206. The activity profile may be stored as a data array that contains information on the times each thread was being executed by the processing unit within the profiling period. Examples of different types of data array will be explained in more detail below.

Returning back to FIG. 5, at step 503, the profiling unit 104 analyses the activity profile to determine whether a signature of the thread execution for the profiling period matches a baseline signature. This step may be performed by the processing unit 306.

The signature of the processing unit's thread execution refers to the pattern of thread execution by the processing unit 106, or more generally to a characterisation of the pattern of the thread execution. The processing unit's pattern of thread execution might be characterised with respect to a set of one or more parameters relating to the thread execution. These parameters might include, for example, one or more of: total number of thread switches; average length of thread execution; maximum length of thread execution; minimum length of thread execution; average frequency of thread switches; maximum and/or minimum frequency of thread switches; sequences of thread execution etc.

A baseline signature may refer to a signature that indicates a baseline of operation, i.e. thread execution, for the processing unit 106, where a baseline of operation/thread execution is a type of operation/thread execution of the processing unit 106 that serves as a basis for comparison or measuring change or deviation. The baseline of operation/thread execution may therefore be a normal, or typical, or expected, operation/thread execution for the processing unit 106.

The profiling unit 104 may store a set of one or more baseline signatures for the processing unit 106. In some examples, the baseline signatures might be generated by the profiling unit 104 by profiling the processing unit 106 over time. For example, the profiling unit 104 might update the baseline signatures over time by profiling the processing unit over multiple profiling periods. In other examples, the baseline signatures might be pre-generated and stored.

The profiling unit 104 might determine that a signature determined from the activity profile matches a baseline signature if it matches the baseline signature to within a specified amount or threshold. Put another way, the profiling unit 104 might determine that a signature determined from the activity profile doesn't match the baseline signature if it deviates or differs from that signature by more than a predetermined amount. The profiling unit 104 uses the comparison of the baseline signature with the thread execution signature determined from the activity profile to determine whether the processing unit 106 is operating in a specified mode of operation corresponding to a normal, typical, or expected mode of operation. If the profiling unit 104 determines that the signature from the activity profile does not match at least one of the baseline signatures, it determines that the processing unit 106 is not operating in a normal or typical way, i.e. it is operating in an anomalous way. In contrast, if the profiling unit determines that the signature from the activity profile does match at least one of the baseline signatures, it determines that the processing unit 106 is operating in a normal or typical way, i.e. it is not operating in an anomalous way.

The analysis of the activity profile may be performed in different ways depending on how the data defining the activity profile is stored.

In one set of examples, the profiling unit stores the activity profile as a data array. The data array may be a linear data array or a two-dimensional data array. It may be in tabular form, such as a CSV file.

The processing unit 306 might analyse the data array using a data processing algorithm to determine whether the activity profile can be classified as indicating a baseline thread execution or not. To do this, the data processing algorithm might analyse the data array to determine the signature of the thread execution over the profiling period indicated by that data array. The signature can then be used to determine whether the thread execution over the profiling period matches a baseline thread execution.

The data processing algorithm might be a trained data classification model. The data classification model might for example be trained using machine learning or deep learning techniques. The data classification model might be trained to classify input data arrays as indicating a baseline thread execution or not indicating a baseline thread indication. The data classification model might be trained using data arrays that do indicate a desired or specified baseline of thread execution. Thus, in this example, the signature of thread execution is not determined explicitly, but rather is implicitly extracted and analysed using the trained data classification model.

Alternatively, the data processing algorithm might calculate the difference between the data array and each of a set of one or more template data arrays each indicating a baseline of thread execution. The data processing algorithm might classify the data array of the activity profile as indicating a baseline of thread execution if the difference between that array and at least one of the template arrays is less than a specified threshold. The difference might be calculated entry-wise for the arrays. The difference might be calculated as a sum of absolute differences across the arrays, for example.

In another example, the data processing algorithm might extract from the data array values for the set of one or more parameters that characterise the signature for the thread execution over the profiling period indicated by that data array, e.g. the parameters identified above. The data processing algorithm may then compare the values of those parameters with stored values for a baseline signature to determine whether the signatures match. Thus, the signature of the thread execution can be determined explicitly. If the set of parameters includes more than one parameter, the extracted values are compared with corresponding values for the baseline signature.

Figure 4:
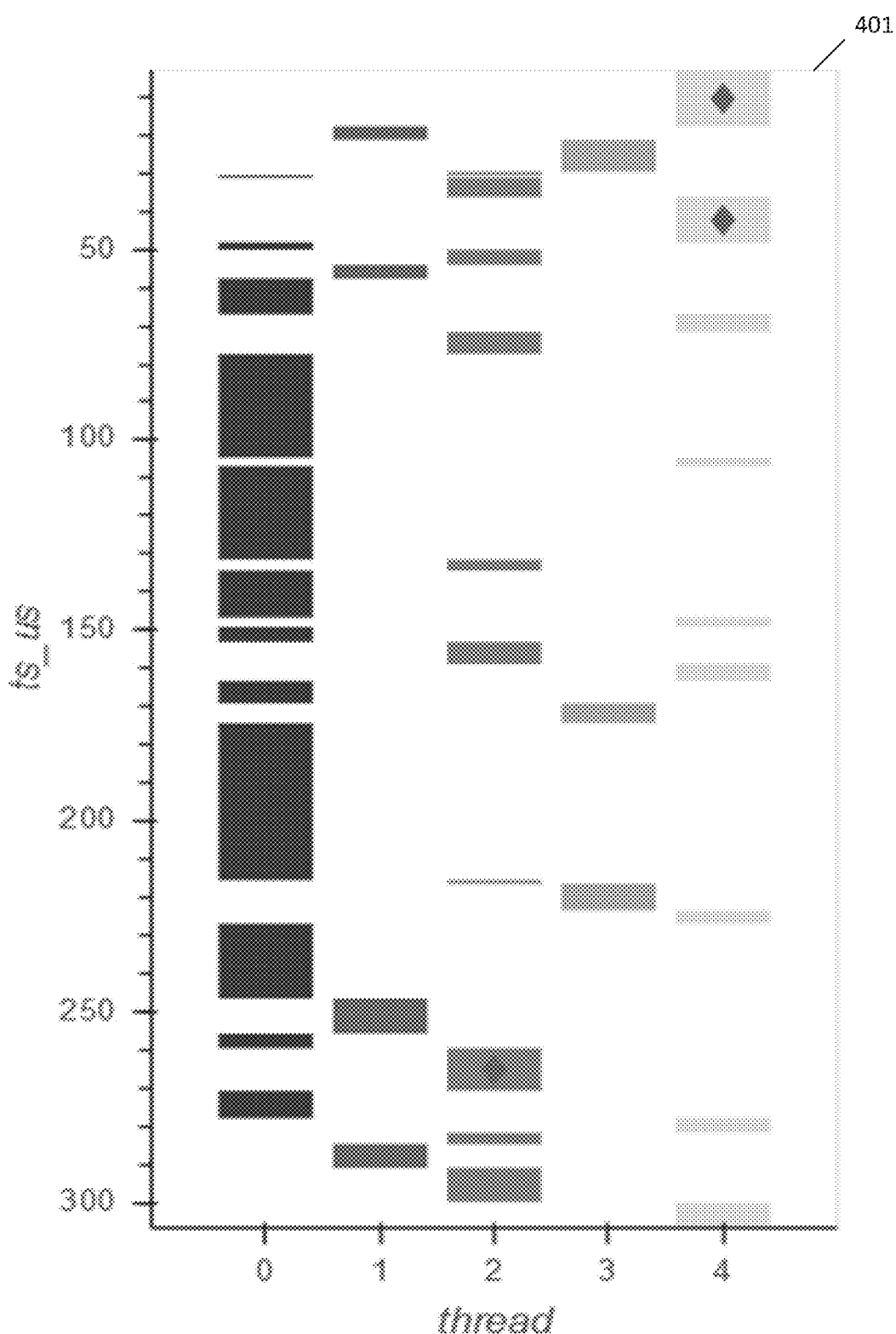
FIG. 4 shows an example of how a processing unit interleaves execution of five threads over a time period.

In one set of examples, the data array may be an image (e.g. a digital image). The image depicts when each thread is executed by the processing unit 106 over the profiling period. In other words, the image depicts the temporal interleaving of the thread execution by the processing unit 106. An example of such an image is shown in FIG. 4 at 401. Here, the solid blocks each indicate a time interval a thread is being executed by the processing unit. In this example, five threads are executed.

If the data array is stored as an image, such as image 401, the data processing algorithms performed by the processing unit 306 might be image processing algorithms. For example, the data processing algorithm might be a trained image classification model that classifies an input image as depicting a baseline thread execution or not depicting a baseline thread indication. The image classification model might be trained using images that do depict a baseline of thread execution.

Alternatively, the image processing algorithm might calculate the difference between the image (e.g. image 401) and each of a set of one or more template images each depicting a baseline of thread execution. The data processing algorithm might classify the image of the activity profile as depicting a baseline of thread execution if the difference between that image and at least one of the template images is less than a specified threshold. The difference might be calculated entry-wise (e.g. block wise, where a block is a block of one or more pixels) for the images. The difference might be calculated as a sum of absolute differences across the images, for example.

The image processing algorithm might analyse the image (e.g. performing image or object recognition) to extract values for the set of one or more parameters that characterise the signature for the thread execution depicted by the image, e.g. the parameters identified above. The image processing algorithm may then compare the values of those parameters with stored values for a baseline signature to determine whether the signatures match (and thus determine whether or not the image obtained from the activity profile depicts a baseline of thread execution).

At step 505, the processing unit 306 generates an alert signal if it determines that the signature of the thread execution for the processing unit 106 does not match a baseline signature. In other words, the processing unit 306 generates the alert signal only if it determines from its analysis that the signature of the processing unit's thread execution for the profiling period does not match, or has deviated from, a baseline signature. The alert signal may therefore indicate that the processing unit 106 is not operating in a baseline mode of operation, e.g. not operating in an expected, or typical, or normal way. In other words, the alert signal might indicate the processing unit is operating in an anomalous way.

The alert signal might be communicated to an on-chip or off-chip entity via the communication interface 208. The alert signal might trigger the component that receives it to perform a responsive action. The alert signal might for example indicate the processing unit 106 has been subject to a security breach, in which case the responsive action might be to disable the processing unit, for example by powering it down or causing it to cease executing further instructions. Alternatively, the responsive action might be to put a lock on the data path from the processing unit 106 to the interconnect circuitry to prevent data from the processing unit 106 propagating through the ICC.

The processing unit 306 might alternatively or in addition analyse the activity profile to determine whether any one thread executes for an anomalously long period of time. For example, the processing unit might determine whether a thread has any continuous period of execution that exceeds a specified threshold. Each thread might be associated with the same threshold or with a respective threshold. The processing unit 306 might generate the output signal in response to detecting that a thread was executed for a continuous time period exceeding the threshold. The output signal might contain an indication (e.g. an ID) of the thread that exceeded its threshold. If more than one thread exceeded its threshold, the output signal might contain an indication of each of those threads.

The profiling unit 104 described herein may be configured to operate for the purpose of chip safety, chip security or chip analytics. In the context of the present disclosure, chip security may relate to detecting data errors on the chip that has potential malicious intent for the purpose of third-party gain. Chip safety may relate to detecting data errors on the chip that has more severe potential consequences, for example a dangerous effect on the wider system in which the chip is implemented. Chip analytics may relate to analysing the behaviour of the chip to gain a further understanding of how the chip functions, or operates. Chip analytics may be performed by dedicated analytics software, potentially being executed off-chip.

The responsive action instigated by the alert signal from the profiling unit may be dependent on the context in which the profiling unit is operating (i.e. the context of chip safety, chip security or chip analytics). For chip security, the responsive action may be to prevent a security breach from occurring. For chip safety, the responsive action may be to prevent a safety breach from happening. For example, in the context of chip safety, data errors may result in a more severe responsive action, such as shutting down or disabling the chip (or at least parts of the chip).

Each component of the ICCs illustrated in FIGS. 1 to 3 may be implemented in dedicated hardware. Alternatively, each component of the SoC illustrated in FIGS. 1 to 3 may be implemented in software. Some components may be implemented in software, whilst other components are implemented in dedicated hardware.

The profiling unit 104 including any sub-units and communication interfaces may be hardware circuits forming part of ICC 100. The components of the profiling unit for controlling and/or monitoring complex core devices and peripherals such as processors may use suitably complex state machines as part of their control unit. Suitably, communication interfaces use suitably complex state machines to implement their complex protocols. Various approaches to realising state machines are known. Such state machines can be realised using: (i) only logic gates; (ii) a combination of logic gates and memory, where the memory is used to contain tables of values to simplify the state machine's operation or to make it programmable; or (iii) a processor core to execute software stored in memory. Where a processor core is used it can be: (i) integral to the sub-unit, communication interface, or other monitoring circuitry; or (ii) shared between several units to reduce their implementation resources and cost.

The ICC described may be incorporated within a computing-based device. The computing-based device may be an electronic device, for example a smartphone, smartwatch, laptop, PC, or some other device that's a component part of a wider computing system, for example a video processor, a control system (e.g. for controlling electric motors, battery an energy management systems in automotive applications), an engine control unit (ECU) etc. Suitably, the computing-based device comprises one or more processors or computing units for processing computer executable instructions to control operation of the device in order to implement the methods described herein. The computer executable instructions can be provided using any computer-readable media such as a memory. The computer-readable media may be non-transitory. The methods described herein may be performed by software in machine readable form on a tangible storage medium. Software can be provided at the computing-based device to implement the methods described herein.

The above description describes the system circuitry and profiling unit as being on the same ICC. In an alternative implementation, the system circuitry and profiling unit are implemented across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the profiling unit may be distributed across more than one integrated circuit chip of the MCM. Thus, the method and apparatus described above in the context of an SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus comprising:
a processing unit configured to execute a plurality of threads; and
a profiling unit configured to:
profile an operation of the processing unit over a time period to generate an activity profile indicating when each of the plurality of threads is executed by the processing unit over the time period;
store the generated activity profile as a data array or an image of the data array;
analyze the generated activity profile to determine whether a signature of the processing unit's thread execution for the time period matches a signature indicating a baseline of thread execution for the processing unit, by using a trained data classification model or a trained image classification model; and
output an alert signal when the signature of the processing unit's thread execution for the time period does not match the signature indicating the baseline of thread execution for the processing unit.

2. The apparatus of claim 1, wherein the activity profile indicates a number of processing unit clock cycles spent executing each thread over the time period.

3. The apparatus of claim 1, wherein the profiling unit is configured to profile the operation of the processing unit by identifying each thread being executed by the processing unit over the time period to generate the activity profile.

4. The apparatus of claim 3, wherein the apparatus is an integrated circuit chip comprising interconnect circuitry, and the profiling unit is configured to identify each thread being executed by the processing unit over the time period by monitoring transactions over interconnect circuitry of the integrated circuit chip.

5. The apparatus of claim 3, wherein the processing unit is configured to maintain a storage location indicating the thread being executed, and the profiling unit is configured to identify each thread being executed by accessing the storage location.

6. The apparatus of claim 3, wherein the profiling unit is configured to identify each thread being executed from sideband signals communicated from the processing unit.

7. The apparatus of claim 1, wherein the trained data classification model analyzes the data array to determine whether the activity profile can be classified as indicating the baseline of thread execution for the processing unit or not.

8. The apparatus of claim 7, wherein the profiling unit is configured to use the trained data classification model to calculate a difference between the data array and each of a set of one or more template data arrays each indicating the baseline of thread execution for the processing unit, the data array being classified as indicating the baseline of thread execution when the difference between that data array and at least one of the template arrays is less than a specified threshold.

9. The apparatus of claim 7, wherein the profiling unit is configured to use the trained data classification model to extract from the data array values for a set of one or more parameters characterizing the signature of the processing unit's thread execution for the time period; and compare the extracted values with corresponding parameter values for the signature indicating the baseline of thread execution.

10. The apparatus of claim 9, wherein the set of one or more parameters comprises one or more of: total number of thread switches over the time period; average length of thread execution for the time period; maximum length of thread execution for the time period; minimum length of thread execution for the time period; average frequency of thread switches for the time period; maximum and/or minimum frequency of thread switches for the time period; and sequences of thread execution for the time period.

11. The apparatus of claim 7, wherein the profiling unit is configured to output the alert signal when the data array is classified as not representing the baseline of thread execution for the processing unit.

12. The apparatus of claim 1, wherein the trained image classification model analyzes the image of the data array to determine whether the image can be classified as depicting a baseline of thread execution for the processing unit or not.

13. The apparatus of claim 12, wherein the profiling unit is configured to use the trained image classification model to calculate a difference between the image and each of a set of one or more template images each depicting the baseline of thread execution for the processing unit, the image being classified as depicting the baseline of thread execution when the difference between that image and at least one of the template images is less than a specified threshold.

14. A method of monitoring a performance of a processing unit executing a plurality of threads, the method comprising:
profiling an operation of the processing unit over a time period to generate an activity profile indicating when each of the plurality of threads was executed by the processing unit over the time period;
storing the generated activity profile as a data array or an image of the data array;
analyzing the generated activity profile to determine whether a signature of the processing unit's thread execution for the time period matches a signature indicating a baseline of thread execution for the processing unit, by using a trained data classification model or a trained image classification model; and
outputting an alert signal when the signature of the processing unit's thread execution for the time period does not match the signature indicating a baseline of thread execution for the processing unit.

15. A non-transitory computer-readable storage medium having stored thereon computer instructions that, when executed by a computing unit of an apparatus comprising a processing unit configured to execute a plurality of threads, cause the computing unit to:
profile an operation of the processing unit over a time period to generate an activity profile indicating when each of the plurality of threads was executed by the processing unit over the time period;
store the generated activity profile as a data array or an image of the data array;
analyze the generated activity profile to determine whether a signature of the processing unit's thread execution for the time period matches a signature indicating a baseline of thread execution for the processing unit, by using a trained data classification model or a trained image classification model; and
output an alert signal when the signature of the processing unit's thread execution for the time period does not match the signature indicating a baseline of thread execution for the processing unit.

* * * * *